United States Patent
Williams et al.

(10) Patent No.: US 9,892,102 B2
(45) Date of Patent: Feb. 13, 2018

(54) LOSSLESS WEB-BASED EDITOR FOR COMPLEX DOCUMENTS

(71) Applicant: Microsoft Technology Licensing, LLC, Redmond, WA (US)

(72) Inventors: Luke Williams, Redmond, WA (US); Ali Taleghani, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 275 days.

(21) Appl. No.: 14/883,760

(22) Filed: Oct. 15, 2015

(65) Prior Publication Data

US 2016/0070685 A1    Mar. 10, 2016

Related U.S. Application Data

(63) Continuation of application No. 12/049,308, filed on Mar. 15, 2008, now abandoned.

(51) Int. Cl.
*G06F 17/00* (2006.01)
*G06F 17/24* (2006.01)
(Continued)

(52) U.S. Cl.
CPC ............ *G06F 17/24* (2013.01); *G06F 17/211* (2013.01); *G06F 17/2247* (2013.01);
(Continued)

(58) Field of Classification Search
CPC ............ G06F 17/2211; G06F 17/2288; G06F 17/30011; G06F 17/211; G06F 17/24;
(Continued)

(56) References Cited

U.S. PATENT DOCUMENTS 6,336,124 B1 * 1/2002 Alam ................. G06F 17/2229
707/E17.006
6,343,302 B1 * 1/2002 Graham ............ G06F 17/3089
707/E17.116

(Continued)

OTHER PUBLICATIONS

O'Reilly & Associates, Inc, "Chapter 3. Text Document Basics", copyrighted 2005, O'Reilly & Associates, Inc, 27 pp.*

(Continued)

*Primary Examiner* — Cesar Paula
*Assistant Examiner* — David Faber (57) ABSTRACT

Lossless web-based editing for XML documents is provided. A method for editing a document over the Internet includes receiving a request on a server over the Internet to edit a document. The server extracts content from the document to form a modified version of the document in XML format and transmits the modified version of the document to the client over the Internet. The client edits the modified version of the document using a web browser editor and transmits changes to the modified version of the document to the server. The server merges the original document and the changes made by the client to form an edited version of the document that updates the document with the client changes and that leaves the remainder of the document intact.

20 Claims, 7 Drawing Sheets

(51) Int. Cl.
*G06F 17/30* (2006.01)
*G06F 17/22* (2006.01)
*G06F 17/21* (2006.01)
*G06F 3/0485* (2013.01)

(52) U.S. Cl.
CPC .... *G06F 17/2288* (2013.01); *G06F 17/30905* (2013.01); *G06F 3/0485* (2013.01); *G06F 17/2211* (2013.01); *G06F 17/30011* (2013.01); *G06F 2206/1512* (2013.01)

(58) Field of Classification Search
CPC ........... G06F 17/30905; G06F 17/2247; G06F 3/0485; G06F 2206/1512
See application file for complete search history.

(56) References Cited

U.S. PATENT DOCUMENTS

| | | | |
|---|---|---|---|
| 6,697,999 B1 * | 2/2004 | Breuer | G06F 17/21 715/236 |
| 6,725,426 B1 * | 4/2004 | Pavlov | G06F 17/2247 715/205 |
| 6,907,565 B1 * | 6/2005 | Huang | G06F 17/241 715/234 |
| 6,950,984 B2 | 9/2005 | Hori et al. | |
| 6,964,025 B2 | 11/2005 | Angiulo et al. | |
| 7,039,859 B1 | 5/2006 | Sundaresan | |
| 7,076,728 B2 | 7/2006 | Davis et al. | |
| 7,111,234 B2 * | 9/2006 | Peck | G06F 17/24 715/255 |
| 7,143,344 B2 | 11/2006 | Parker et al. | |
| 7,191,395 B2 | 3/2007 | Adler et al. | |
| 7,340,673 B2 * | 3/2008 | Malone | G06F 17/214 715/234 |
| 7,389,473 B1 * | 6/2008 | Sawicki | G06F 17/211 715/237 |
| 7,523,394 B2 * | 4/2009 | Jones | G06F 17/211 707/999.009 |
| 7,571,169 B2 * | 8/2009 | Jones | G06F 17/211 |
| 7,624,342 B2 * | 11/2009 | Matveyenko | G06F 17/2247 715/255 |
| 7,703,004 B2 | 4/2010 | Bier | |
| 7,721,254 B2 * | 5/2010 | Relyea | G06F 8/20 345/594 |
| 7,974,991 B2 * | 7/2011 | Jones | G06F 17/211 707/802 |
| 2001/0014900 A1 * | 8/2001 | Brauer | G06F 17/211 715/201 |
| 2002/0069204 A1 * | 6/2002 | Kahn | G06F 17/24 |
| 2002/0073125 A1 * | 6/2002 | Bier | G06F 17/24 715/255 |
| 2002/0078140 A1 * | 6/2002 | Kelly | G06F 17/272 709/203 |
| 2003/0023632 A1 * | 1/2003 | Ries | G06F 17/3089 715/235 |
| 2003/0101416 A1 * | 5/2003 | McInnes | G06F 17/243 715/234 |
| 2004/0210818 A1 * | 10/2004 | Jones | G06F 17/211 715/236 |
| 2005/0102265 A1 * | 5/2005 | Jones | G06F 17/211 |
| 2005/0108198 A1 * | 5/2005 | Jones | G06F 17/211 |
| 2005/0108278 A1 * | 5/2005 | Jones | G06F 17/211 |
| 2005/0240869 A1 * | 10/2005 | Leetaru | G06F 17/30861 715/234 |
| 2006/0015816 A1 | 1/2006 | Keuhner et al. | |
| 2006/0031757 A9 | 2/2006 | Vincent, III | |
| 2006/0143562 A1 | 6/2006 | Seurig et al. | |
| 2006/0224697 A1 | 10/2006 | Norris | |
| 2007/0030528 A1 * | 2/2007 | Quaeler | G06F 17/30634 358/453 |
| 2009/0119578 A1 * | 5/2009 | Relyea | G06F 9/4443 715/234 |
| 2009/0235161 A1 | 9/2009 | Williams et al. | |
| 2014/0053068 A1 * | 2/2014 | Devi | G06F 17/241 715/256 |

OTHER PUBLICATIONS

Mertz, David, "Tip: Subelement contents versus tag attributes", Oct. 2001, Gnosis Software, Inc, 4pp.*
Oliver Meyer, "aTool—Creating Validated XML Documents on the Fly Using MS Word", Oct. 20, 2002, pp. 113-121.*
Quint, V. et al.; "Techniques for Authoring Complex XML Documents"; DocEng '04, pp. 115-123, Oct. 28-30, 2004, http://delivery.acm.org/ 10.1145/1040000/1030422/9115-quint.dpf?key1=1030422&key2=6838456811&coll=GUIDE &dl=GUIDE&CFID=26172174&CFTOKEN=19035216.
Isard, A. et al.; "The MATE Workbench—A Tool for Annotating XML Corpora"; Proceedings of Rechereche d'Informations Assistee par Ordinaateur (RIAO '2000), Apr. 2000, 15 pgs.; http://www.amengel.de/ pubs/riao.pdf.
Flores et al.; "Templates, Microformats and Structured Editing"; DocEng '06, pp. 188-197; Oct. 10-13, 2006; http://delivery.acm.org/10.1145/1170000/1166211/p188-flores.pdf?key1=1166211 &key2=3035556811&coll =GUIDE&dl=GUIDE &CFID=31091458.
U.S. Appl. No. 12/049,308, Office Action dated Feb. 17, 2011, 17 pages.
U.S. Appl. No. 12/049,308, Amendment and Response filed Jul. 18, 2011, 11 pages.
U.S. Appl. No. 12/049,308, Office Action dated Sep. 2, 2011, 18 pages.
U.S. Appl. No. 12/049,308, Amendment and Response filed Dec. 2, 2011, 12 pages.
U.S. Appl. No. 12/049,308, Advisory Action dated Dec. 16, 2011, 3 pages.
U.S. Appl. No. 12/049,308, Office Action dated Apr. 7, 2015, 7 pages.
U.S. Appl. No. 12/049,308, Amendment and Response filed Jul. 7, 2015, 8 pages.
U.S. Appl. No. 12/049,308, Notice of Allowance dated Jul. 20, 2015, 5 pages.

* cited by examiner

202
Web Front End Module

204
Extraction Module

206
Merge Module

LOSSLESS WEB-BASED EDITOR FOR COMPLEX DOCUMENTS

CROSS-REFERENCE TO RELATED APPLICATIONS

This application is a continuation application and claims priority to U.S. patent application Ser. No. 12/049,308, filed Mar. 15, 2008, entitled "Lossless Web-Based Editor For Complex Documents," which application is incorporated herein by reference in its entirety.

BACKGROUND

It is desirable to be able to access and edit documents over the Internet. This is particularly useful for collaboration among different people so that everyone can have access to the document. Because documents are often written with proprietary word processing programs and because Internet users do not always have this proprietary software, it is desirable to be able to edit documents over the Internet that are formatted according to a given language, for example, with a general purpose markup language, such as the Extensible Markup Language (XML).

Often when documents are created according to a given system or language are converted to an editable format for use with another language or format, document content may be lost. For example, when documents created with a proprietary word processing system are converted to web format, for example, Hypertext Markup Language (HTML) or some proprietary format, content and features of the documents, such as applied styles and formatting, may be stripped out of the document. For a specific example, a document formatted according to XML that is converted to HTML for use in an Internet-based application may experience content or formatting losses. This is because the software program used during the conversion may not understand how to handle the proprietary features applied to the document by the application used for creating the document. Users are often willing to lose these features because of the advantages of web-based editing. However, the resulting edited document may not have the look and feel of the original.

SUMMARY

The present disclosure relates to a system and methods for editing documents over the Internet using a web browser in a manner such that the all the features of the original document are preserved.

The above and other problems are solved by lossless web-based editing of documents. According to an embodiment, editing a document over the Internet includes receiving a request on a server over the Internet to edit a document created via a given language, for example, XML. The server extracts content from the document to form a modified version of the document and transmits the modified version of the document to a user over the Internet. The modified version of the document is edited via a web browser editor and changes to the modified version of the document are transmitted to the server. The server merges the original document and the changes made by the user to form an edited version of the document that updates the document with the changes and that leaves the remainder of the document intact, including any attributes such as styles or formatting originally applied to the document.

According to an embodiment, a request is received on a server over the Internet to render a document stored on the server. The document is transmitted to a client over the Internet. A request is then received from the client to edit the document. Content is extracted from the document to form a modified version of the document, and the modified version is transmitted to the client over the Internet. The modified version of the document from the server may include extracted content from the document, paragraph identifiers, runs and separator tags that identify the content. If changes to the modified version of the document are received over the Internet, the original document and the changes to the modified version of the document are merged to form an edited version of the document that updates the document with the changes to the modified version of the document and that leaves the remainder of the document intact.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF THE DRAWINGS

The accompanying drawings incorporated in and forming a part of the specification illustrate several aspects of the present disclosure, and together with the description serve to explain the principles of the disclosure. In the drawings.

DETAILED DESCRIPTION

The present application is directed to editing documents over the Internet in a way in which all features of the original document are preserved after the editing process is completed. Editing in this manner is known as lossless editing.

Figure 1:
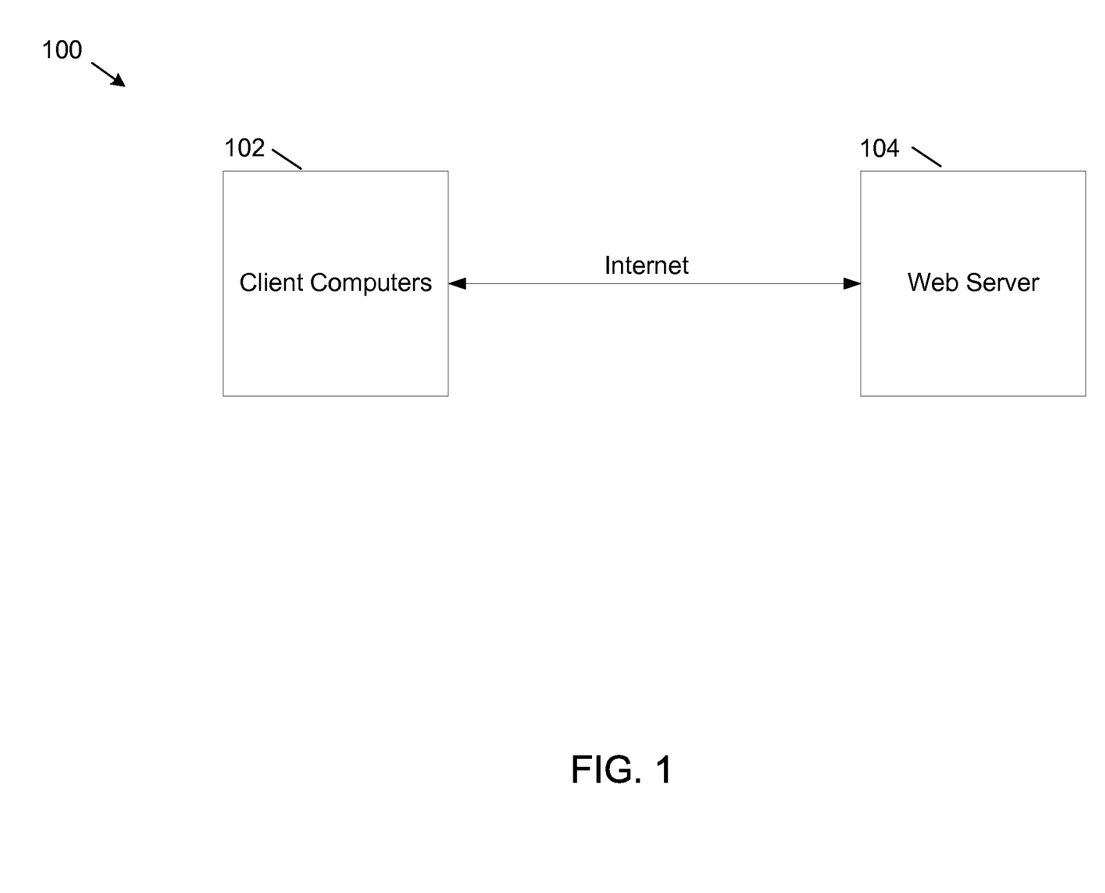
FIG. 1 shows an example system for editing documents over the Internet.

FIG. 1 shows an example computer system 100 that illustrates a system for editing documents over the Internet. The system includes one or more client computers (clients) 102 and a web server 104 all connected to the Internet. The web server 104 stores documents that can be viewed and edited by a client. For example, the documents may be stored in a proprietary file type such as .docx which is a default file type for word processing documents created with certain versions of the WORD word processing application provided by MICROSOFT CORPORATION. As should be appreciated, the .docx file format is for purposes of example only and is not limiting of the vast number of file types associated with documents that may require Internet-based editing as described herein. For example, many other file types, such as .dotx, .docm, .dotm, and others, may be associated with documents requiring Internet-based editing according to embodiments of the invention.

In example embodiments, a client 102 can be a personal computing device, such as a desktop or laptop computer, a personal data assistant, or a cellular telephone. A client 102 can include input/output devices, a central processing unit ("CPU"), a data storage device, and a network device. Typical input/output devices include keyboards, mice, displays, microphones, speakers, disk drives, CD-ROM drives, and flash drives. Computer readable media, such as the data storage device, provide for data retention. By way of example, computer readable media can include computer storage media and communication media. Computer storage media includes volatile and nonvolatile, removable and non-removable media implemented in any method or technology for storage of information such as computer readable instructions, data structures, program modules or other data. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Among the plurality of information stored on the data storage device is a client operating system ("OS") and client applications. The client OS is a program that manages the hardware and software resources of the client system. The client applications utilize the resources of a client 102 to directly perform tasks specified by the user. Other configurations for the clients 102 are possible.

Figure 2:
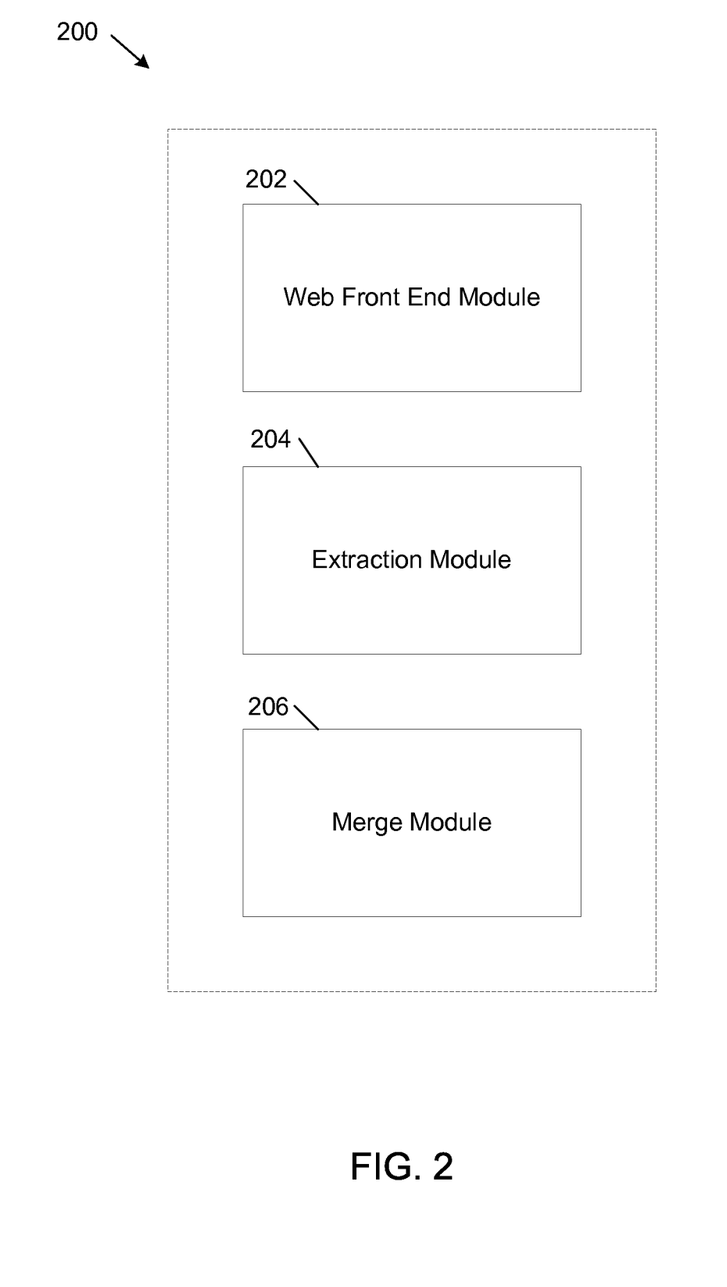
FIG. 2 shows example modules of a web server used to facilitate the editing of documents over the Internet.

FIG. 2 shows modules of an example web server 200 that implements a system for lossless editing of documents over the Internet. The example system 200 includes a web front end module 202, an extraction module 204 and a merge module 206. The web front end module 202 receives requests from clients to display and edit documents stored on the web server 200, transmits the documents to the client and receives edited versions of the document from the client.

The extraction module 204 extracts elements from the document that can be edited with a web browser editor, for example, an editor that reads and edits HTML strings or one that understands XML. The extracted elements are predominantly text, but they can also include pictures, tables, fields, character formatting, paragraph formatting, headers and footers, etc. When the web front end module 202 receives a request to edit a document in a first format, for example, .docx format, the extraction module 204 opens the document and extracts the XML part. The XML elements are then searched for paragraphs and for runs within a paragraph. A run is a series of continuous elements, for example, a string of words. Each time the element changes, for example by a formatting change, by having a picture after a string of words, by the insertion of a new object, etc., a new run starts. For example, a series of three consecutive words, the first using bold formatting, the second not using bold formatting and the third using bold formatting would consist of three runs. The use of runs in this manner permits the preservation of formatting changes that a simple text editor does not understand.

According to an embodiment, each run is written into a format the receiving web application will understand, for example, a different XML format from the original document, HTML, plain text, or a proprietary format. For example, each run may be written into a string in a standard web markup language, for example, an HTML string. According to one embodiment, content in the web application editor may be mapped to content in the original document, for example, using unique IDs, and the separate content pieces are delineated from each other. For example, paragraphs may be marked with paragraph tags, for example, a custom "docxID" attribute, and the runs may be separated by custom separator tags, for example, <docxRun docxID="0">. The paragraph tags and separator tags may be used to identify the edited elements so they can be merged and reinserted into the original document after editing.

The example HTML strings are inserted into a modified version of the original document which is transmitted to the client for editing. Because this example modified version of the document contains HTML strings it can be edited with a text editor that does not need to understand the proprietary formatting, fonts and other features of the original document. It should be understood that HTML is used herein as an example language/format into which a given document may be converted. Many other suitable formats or languages, such as XML, plain text, or many proprietary formats may be used in accordance with embodiments of the invention.

When extracting elements from the original document and inserting these elements into the modified version of the document, the extraction module maps areas of the modified version to the original document. For example, the extraction module may keep a table of indices that identifies where paragraphs and runs are in both the original and modified documents. These indices are used to locate the appropriate paragraph tag and run in the original document when the edited changes are merged into the original document.

As should be appreciated, in addition to paragraphs and text runs, may other content types and content attributes may have been edited, and the associated changes may have been uploaded as described herein. For example, other types of content types and content attributes may include tables, pictures, document fields, formatting and style attributes, and the like. For purposes of the present description, the term "paragraphs or runs" should be understood to include any content type or attribute the web editor application is capable of working with.

According to one embodiment, one content type applicable to embodiments of the invention includes tables. In the case of tables, a given table may be assigned a unique ID, and table rows and cells within rows each may receive unique IDs for mapping content in tables, rows and cells at the web editor with tables, rows and cells from an original table file. Thus, objects in a table that are changed during an editing session may be reflected back to the document during document merger described below.

Still referring to FIG. 2, the merge module 206 receives document changes from the client and merges these changes into the original document in a way that preserves the original features of the document, so that nothing in the original document is lost. After the client edits the modified version of the original document it uploads the changes to the server but it does not upload the entire document. This is done to save bandwidth and obviates the need to upload the entire document when only a portion of the document has changed. The merge module 206 scans the uploaded changes and identifies the paragraph tags and runs in the document.

The merge module 206 then compares these paragraph tags and runs (or other content types or attributes) with the paragraph tags and runs in the original document in order to determine how to merge the client changes and the original document. The end result is to incorporate the client changes into the original document and since nothing else in the original document changed, all the features, look and style of the original document are preserved.

Some examples of client edits received by the merge module 206 include editing text within a run, deleting a run, deleting a paragraph, creating a paragraph, splitting a paragraph and combining two paragraphs. Other types of edits are possible. When the merge module 206 of the web server receives these edits it determines what changes to make to the original document. For example, if text is edited within a run, text in the original document is overwritten with the changed text. If the server module 206 determines that there is no content between two run separators, the corresponding run in the original document is deleted. If the server module 206 determines that a paragraph identifier is missing (for example, the sequence is 1, 2, and 4 with 3 missing), the corresponding paragraph is deleted from the original document. If the server module 206 determines that there is a new paragraph (because the user pressed enter at the end or start of an existing paragraph), the new paragraph is inserted in the appropriate area of the original document. If the server module 206 determines that there is a split in an existing paragraph (because the user pressed enter in the middle of a paragraph), run separator tags from the original document may now be contained in two separate paragraphs. For this case, the server module 206 moves the runs from the original paragraph into the new paragraph. If the server module 206 determines that two paragraphs were combined (e.g., because the user pressed delete at the end of a paragraph or the user pressed backspace at the beginning of a paragraph), the server module 206 concatenates the runs from the original paragraph into the combined paragraph and deletes the original paragraph.

Figure 3:
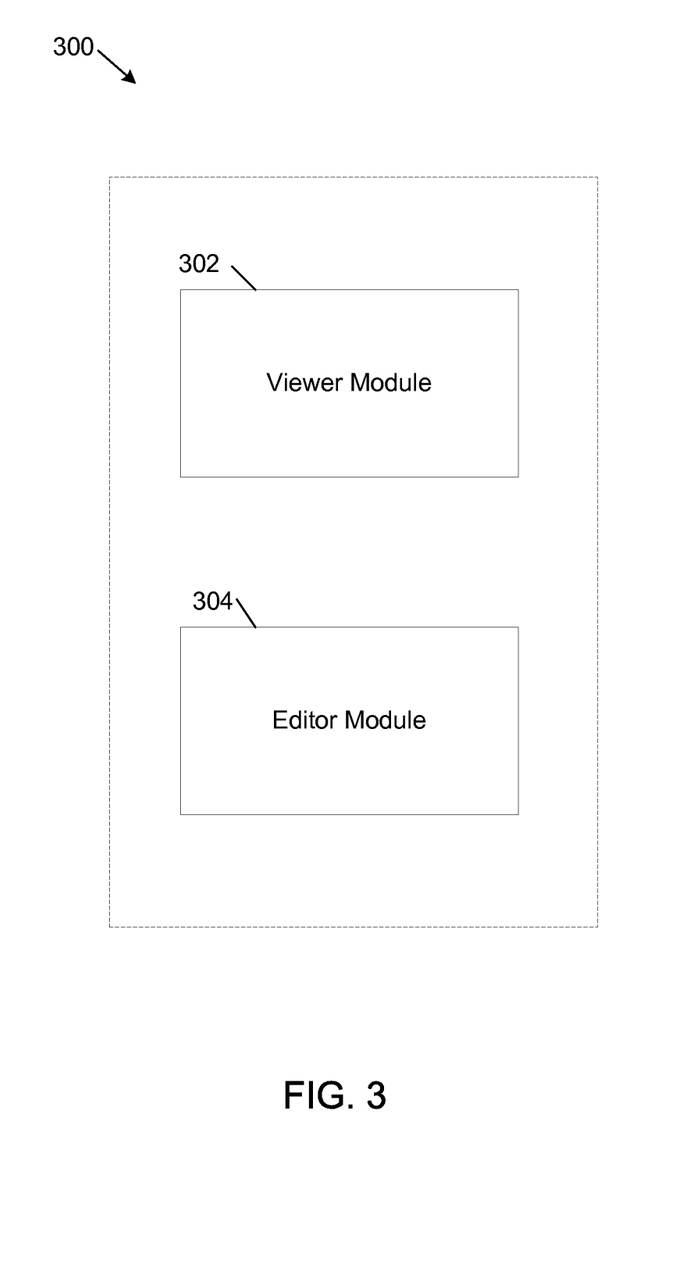
FIG. 3 shows example modules of a client web browser that are used to view and edit documents.

FIG. 3 shows the modules of an example web browser 300 that includes the functionality to edit web documents over the Internet. Included in the web browser 300 are a viewer module 302 and an editor module 304. The viewer module includes a viewer used to display a document the user may want to edit. The editor module includes an editor used to edit the document the user wishes to edit.

Figure 4:
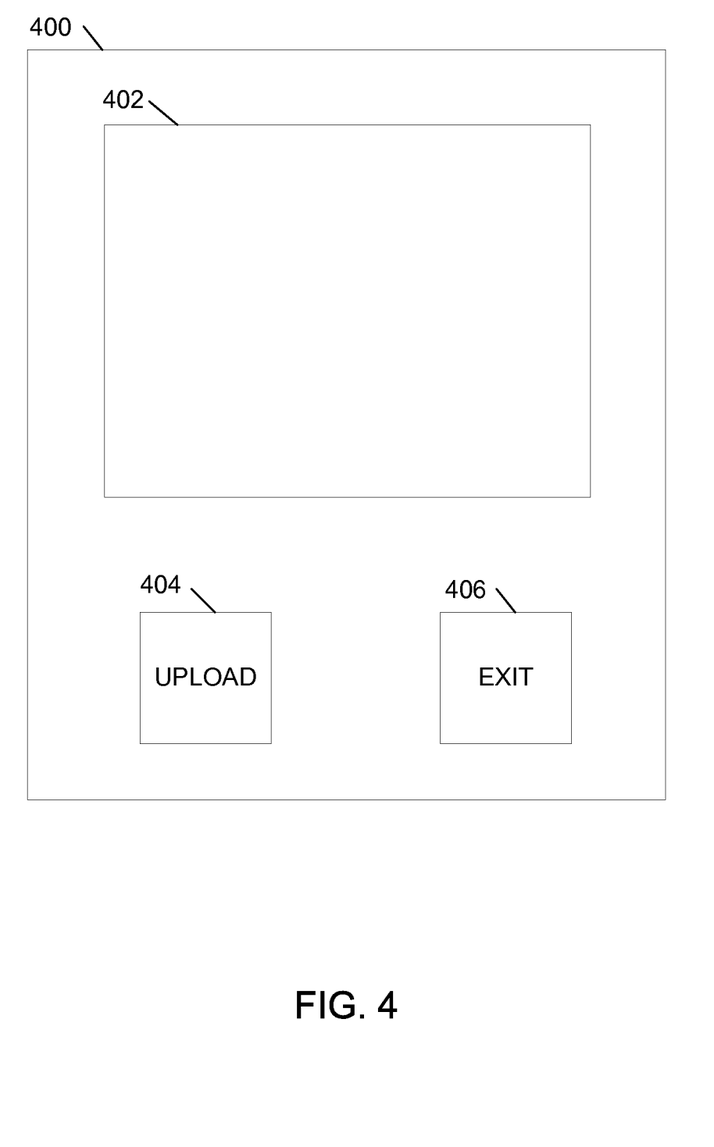
FIG. 4 shows an example viewer used to display documents in a web browser.

When a user accesses a website that contains a document the user wishes to view and possibly edit and the user selects the document, the document is displayed in a viewer controlled by viewer module 302. FIG. 4 shows an example viewer 400 that is called up by the web browser. The example viewer includes a display area 402, typically an IFrame, in which the document is displayed. The example viewer also includes an upload button 404 and an exit button 406. The viewer displays the document using software that displays as many features of the document as possible. It will be appreciated that not all features of the document can be displayed because many features are proprietary and not understood by the software.

If the user decides to edit the document, the user presses the upload button 404. This initiates a message to the web server 104 to inform the web server that the document is to be edited. If the user chooses not to edit the document, the user presses the exit button 404. This closes the viewer. It will be appreciated that the configuration of the viewer 400 shown in FIG. 4 is only an example. Many other configurations for the viewer are possible.

Figure 5:
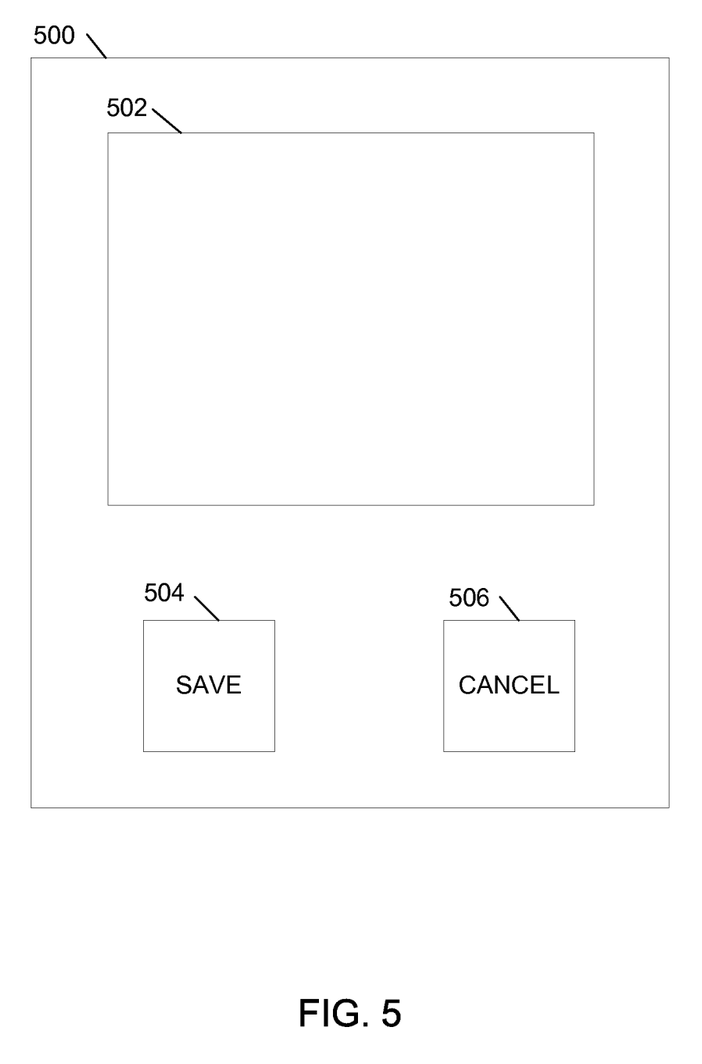
FIG. 5 shows an example editor used to edit documents in a web browser.

FIG. 5 shows an example editor 500 that displays the document to be edited. As discussed earlier, the document to be edited is a subset of the original document, containing extracted elements of the original document that are in a standard format such as XML or HTML. This modified document is displayed in display area 502 of the example editor 500. The example editor 500 also includes a save button 504 and a cancel button 506. After the user finishes editing the document, the save button 502 is pressed to upload the edited document to the web server 104. If the user decides not to save the edited changes, the cancel button 506 is pressed. It will be appreciated that the configuration of the editor 500 shown in FIG. 5 is only an example. Many other configurations for the editor are possible.

Figure 6:
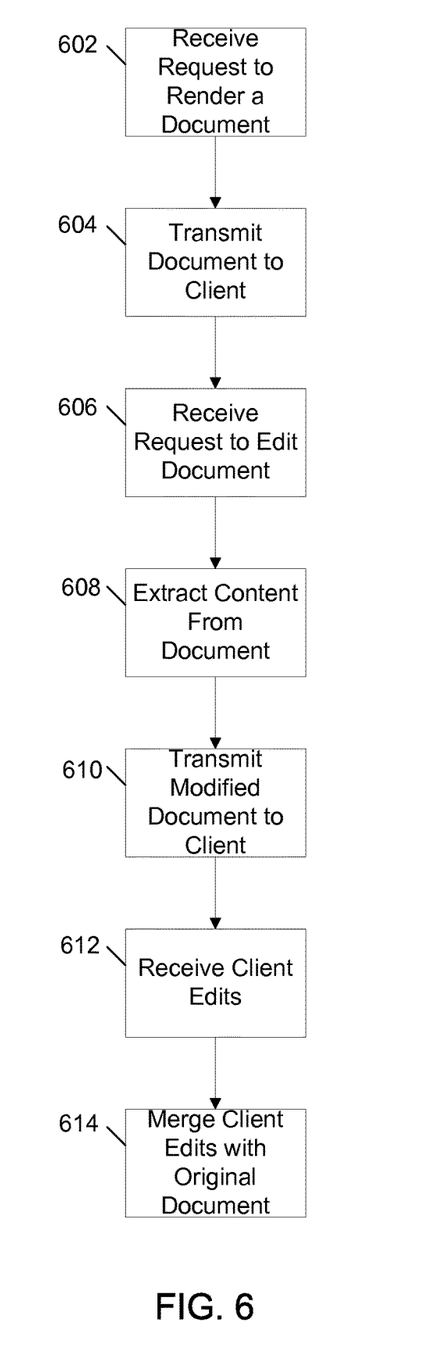
FIG. 6 shows a flow chart for an example method of editing documents over the Internet.

FIG. 6 is a flowchart that illustrates an example method for editing a document over the Internet. At operation 602 a request to render a document is received at a web server. This request is typically initiated by a client that visits a website, for example, OFFICE LIVE from MICROSOFT CORPORATION, which contains documents that can be edited. At operation 604, the web server sends the requested document to the client. Because the document is typically written in and stored on the server in a proprietary format (for example in .docx format), the web server renders the document in a format that is easy for the web browser on the client to view (for example, by using a silverlight format file that can be viewed with a MICROSOFT SILVERLIGHT plug-in on the client's web browser, by using a Portable Network Graphics (PNG) file, etc.).

At operation 606, if the client decides to edit the document, the web server receives a request to edit the document, typically initiated by the client pressing an edit button on the web browser editor. At operation 608, in response to the request to edit the document, the web server extracts content from the document and creates a modified version of the document that includes this content. The content extracted is typically text but it can also include, pictures, tables, formatting information, etc. Text that is extracted from the original document is typically converted into a text format such as XML or HTML. For example, text from a .docx document may be converted into HTML strings and stored in the modified document. It will be understood that the text may also be converted into formats other than HTML and XML.

When extracting content, the original document is scanned from top to bottom to identify all the paragraph tags and text runs. Each paragraph tag and text run in the original document is identified and mapped to the corresponding paragraph tags and text runs in the modified version of the document.

At operation 610, the modified version of document containing the extracted content from the original document is sent to the client. The client edits the document and at operation 612, the web server receives the client edits. The client edits are then merged into the original document at operation 614. When doing the merge at operation 614, the web server compares the paragraph and run identifiers in the client changes with the paragraph and run identifiers from the original document to determine how to implement the merge. Because the original document is preserved on the web server, once the merge is completed all the content, features and formatting of the original document are preserved.

Figure 7:
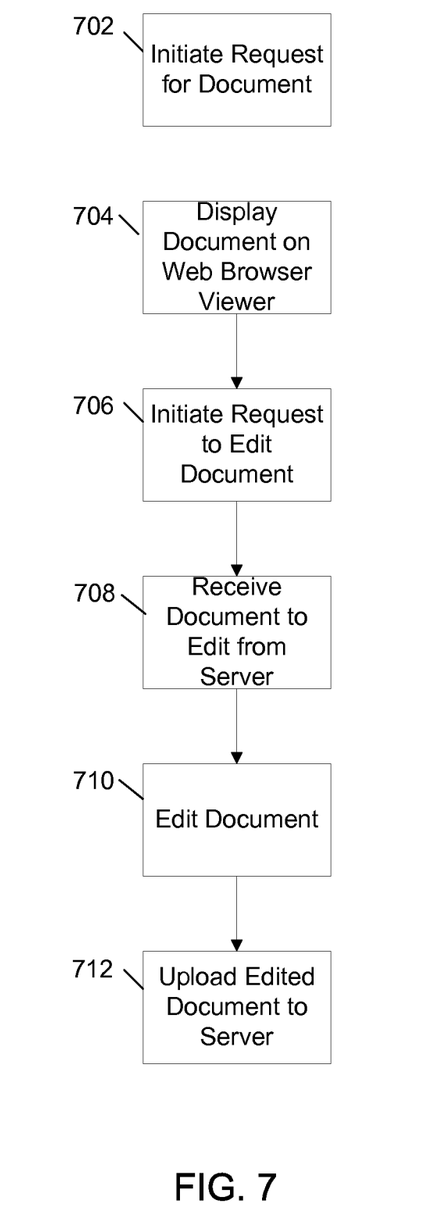
FIG. 7 shows a flow chart for an example method for editing documents on a client web browser.

FIG. 7 is a flowchart that illustrates an example method for editing a document over the Internet using a client web browser. At operation 702, the client uses its web browser to connect to a shared document web site and initiates a request for a document stored on that web site. At operation 704, the document is received from the web server and displayed on a viewer that that is part of the web browser. The viewer displays the document and includes in the display as many features of the document that the viewer software can understand. At operation 706, if the user decides to edit the document, the user initiates an edit request, typically by pressing an edit button on the viewer. This results in the web browser bring up an editor and displaying a modified version of the document in the editor at operation 708. The modified version of the document includes text strings extracted from the original document and displayed in a web compatible format, such as HTML, Flash, XML or other suitable web compatible format.

At operation 710, the user edits the document displayed in the editor and at operation 712 when editing is complete, the user uploads the changes made to the document to the web server. This is typically done by pressing a button, such as an upload button, on the editor. Alternatively, an automatic save feature may be utilized to automatically push user edits up to the server on a periodic basis.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for editing a document over the Internet, the method comprising:
    receiving requests from one or more clients to display and edit documents;
    processing the requests;
    extracting content from a document based on a processing of one of the requests to form extracted content;
    inserting the extracted content into a modified version of the document that can be edited by a given client,
    wherein the extracted content comprises a plurality of runs, each of the plurality of runs comprising a series of continuous elements, the series of continuous elements in a first run in the plurality of runs having a different text formatting than the series of continuous elements in a second run in the plurality of runs, the plurality of runs utilized to permit preservation of formatting changes that are not understood by a simple text editor; and
    merging the document and changes made to the modified version of the document to update the document with only the changes made to the modified version of the document while leaving a remainder of the document intact by preserving original features, look, and style associated with the document.

2. The method of claim 1, wherein the receiving the requests comprises receiving the requests to display and edit the documents in a format that is not compatible with an Internet-based document editor.

3. The method of claim 2, wherein the modified version of the document is in a format that is compatible with the Internet-based document editor.

4. The method of claim 1, wherein the extracted content is text.

5. The method of claim 4, further comprising formatting the text into HTML strings in the modified version of the document.

6. The method of claim 5, further comprising mapping the extracted content in the modified version of the document to corresponding locations in the document.

7. The method of claim 6, further comprising identifying sections of the extracted content in the modified version of the document and in the document by paragraph identifiers.

8. The method of claim 1, wherein the plurality of runs in the extracted content in the modified version of the document are separated by custom separator tags.

9. The method of claim 1, further comprising comparing paragraph identifiers and runs from the changes to the modified version of the document with paragraph identifiers and runs from the document when merging the document and the changes to the modified version of the document.

10. A computer storage media, that is not a carrier wave or signal, containing computer executable instructions which when executed perform a method for editing a document over the Internet, the method comprising:
    processing requests from one or more clients to display and edit documents;
    extracting content from a document in response to the processing of at least one of the requests to form extracted content,
    wherein the extracting content from the document to form a modified version of the document comprises:
    scanning the document to identify all paragraph tags and text runs to form identified paragraph tags and identified text runs, and
    mapping the identified paragraph tags and the identified text runs to corresponding paragraph tags and corresponding text runs in the modified version of the document;
    inserting the extracted content into the modified version of the document that can be edited by a given client,
    wherein the extracted content comprises a plurality of runs, each of the plurality of runs comprising a series of continuous elements, the series of continuous elements in a first run in the plurality of runs having a different text formatting than the series of continuous elements in a second run in the plurality of runs, the plurality of runs being utilized to permit the preservation of formatting changes that are not understood by a simple text editor; and
    merging the document and changes made to the modified version of the document to update the document with only the changes made to the modified version of the document while leaving a remainder of the document intact by preserving original features, look, and style associated with the document, wherein merging the changes to the modified version of the document to update the document comprises:
    comparing paragraph tags and text runs of the changes in the modified version of the document with the identified paragraph tags and the identified text runs from the document to determine how to implement the merging.

11. The computer-readable storage media of claim 10, wherein the document is in a format that is not compatible with an editor on a web browser responsible for allowing Internet-based editing of the document.

12. The computer-readable storage media of claim 11, wherein the modified version of the document is in a format that is compatible with the editor on the web browser responsible for allowing Internet-based editing of the document.

13. The computer-readable storage media of claim 10, wherein the extracted content comprises text.

14. The computer-readable storage media of claim 10, wherein the extracted content comprises pictures.

15. The computer-readable storage media of claim 10, wherein the extracted content comprises tables.

16. A system for editing documents on the Internet, the system comprising:
    at least one processor; and
    memory encoding computer executable instruction that, when executed by the at least one processor, perform a method comprising:

processing at least one request from at least one client to display and edit a document;

extracting content from the document in response to the processing of the at least one request to form extracted content;

inserting the extracted content into a modified version of the document that can be edited by a given client, wherein the extracted content comprises a plurality of runs, each of the plurality of runs comprising a series of continuous elements, the series of continuous elements in a first run in the plurality of runs having a different text formatting than the series of continuous elements in a second run in the plurality of runs, the plurality of runs utilized to permit preservation of formatting changes that are not understood by a simple text editor; and merging the document and changes made to the modified version of the document to update the document with only the changes made to the modified version of the document while leaving a remainder of the document intact by preserving original features, look, and style associated with the document.

17. The system of claim 16, wherein the document is in a format that is not compatible with the given client to be used for editing the document.

18. The system of claim 16, wherein the modified version of the document is in a format that is compatible with the given client to be used for editing the document.

19. The system of claim 16, wherein the method further comprises:

mapping the extracted content from the document to corresponding locations in the modified version of the document.

20. The system of claim 16, wherein a new run is started each time there is a change in an element in the series of continuous elements, the change comprising at least one of a formatting change, a picture after a string of words, or an insertion of a new object.

* * * * *